United States Patent [19]

Murphy

[11] 4,161,375

[45] Jul. 17, 1979

[54] CONNECTOR FOR TUBES OF SQUARE CROSS-SECTION

[76] Inventor: Pierce M. Murphy, 111 S. Second St., LaCrosse, Wis. 54601

[21] Appl. No.: 903,251

[22] Filed: May 5, 1978

[51] Int. Cl.² ............................................. F16D 1/00
[52] U.S. Cl. .................................. 403/169; 403/353; 403/406
[58] Field of Search .............................. 403/169–178, 403/231, 297, 314, 348, 350, 353, 383, 401, 402, 406

[56] References Cited

U.S. PATENT DOCUMENTS

| | | | |
|---|---|---|---|
| 3,532,369 | 10/1970 | Reilly | 403/176 |
| 3,645,569 | 2/1972 | Reilly | 403/406 X |
| 3,666,298 | 5/1972 | Reilly | 403/172 |
| 4,072,432 | 2/1978 | Levy | 403/170 |

FOREIGN PATENT DOCUMENTS

| | | | |
|---|---|---|---|
| 1471179 | 1/1967 | France | 403/174 |
| 1011688 | 12/1965 | United Kingdom | 403/178 |

*Primary Examiner*—Wayne L. Shedd
*Attorney, Agent, or Firm*—Vogel, Dithmar, Stotland, Stratman & Levy

[57] ABSTRACT

A connector for tubes of square cross-section comprises an elongated hollow metallic member of such size and shape in external cross-section as to be insertable within an end length of a tube for connection therewith. The member has at least two external longitudinal surfaces of minor width on opposite sides thereof. Spaced integral transverse teeth are provided on at least one of the longitudinal surfaces, the transverse distance between the surface of the teeth and the opposite longitudinal surface being greater than an internal transverse dimension of a tube to be connected to the member. Relative rotation between a tube and a member inserted therein causes the teeth to bite into an internal surface of the tube and thus establish secure connection. The connector may have teeth on both opposite longitudinal surfaces of minor width, and there may be a second pair of toothed longitudinal surfaces of minor width in quadrature relation with the first pair. In some forms of the invention, a longitudinal slot or longitudinal slots are located in a wall or walls of the member adjacent a toothed longitudinal surface, the slot length being slightly less than the length of the member insertable within the tube, thereby imparting resilience and enabling the member to accommodate tolerances in internal tube dimensions. Resilient material may be provided in the slot or slots. Alternatively, a thin integral wall may overlie the exterior of a slot, the wall preferably being arcuate in transverse cross-section.

16 Claims, 9 Drawing Figures

U.S. Patent  Jul. 17, 1979  4,161,375
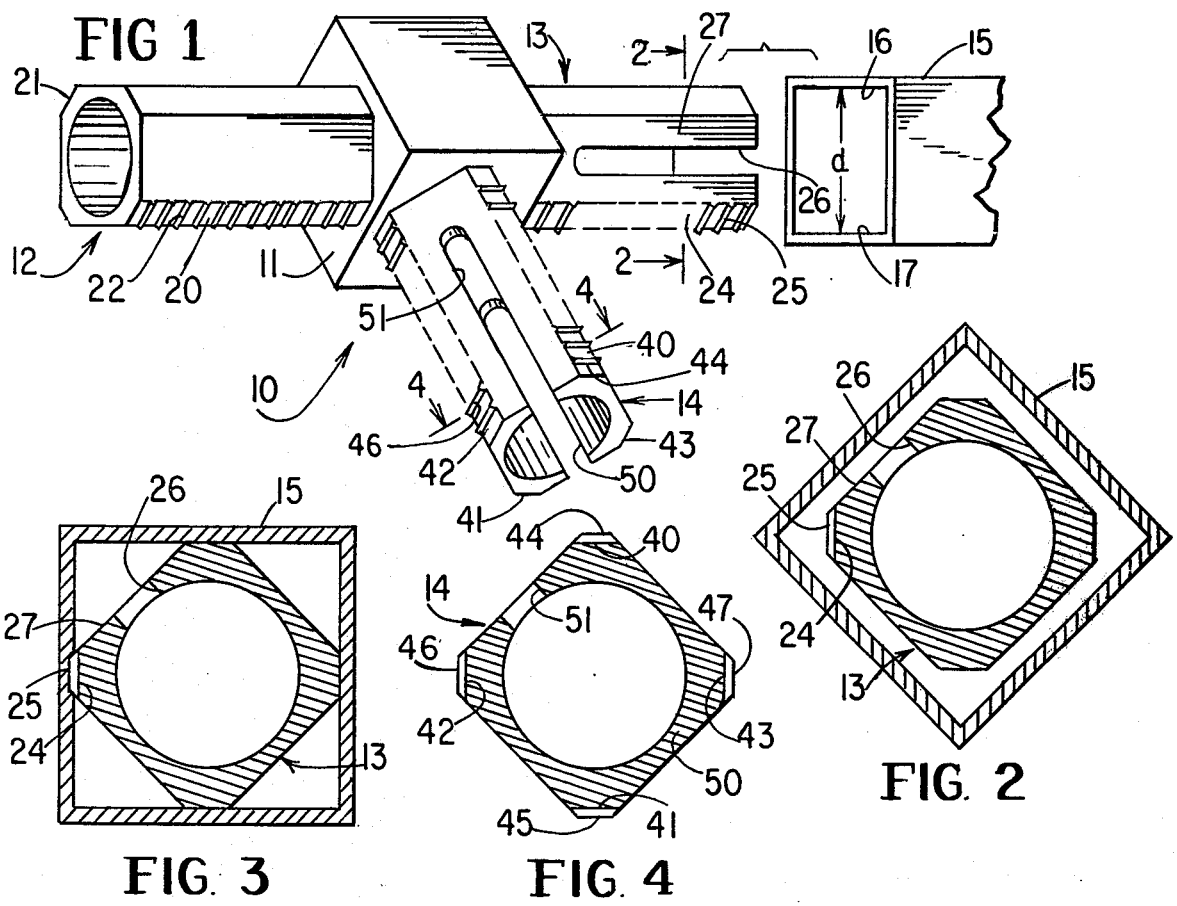
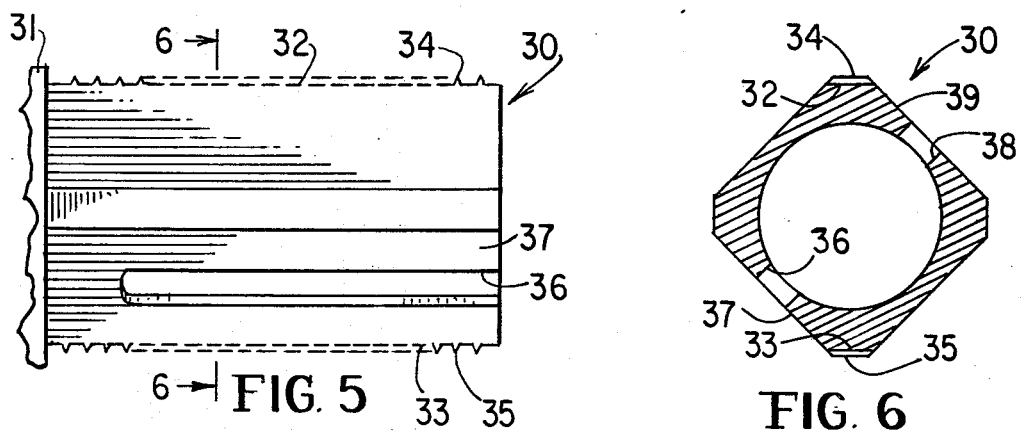
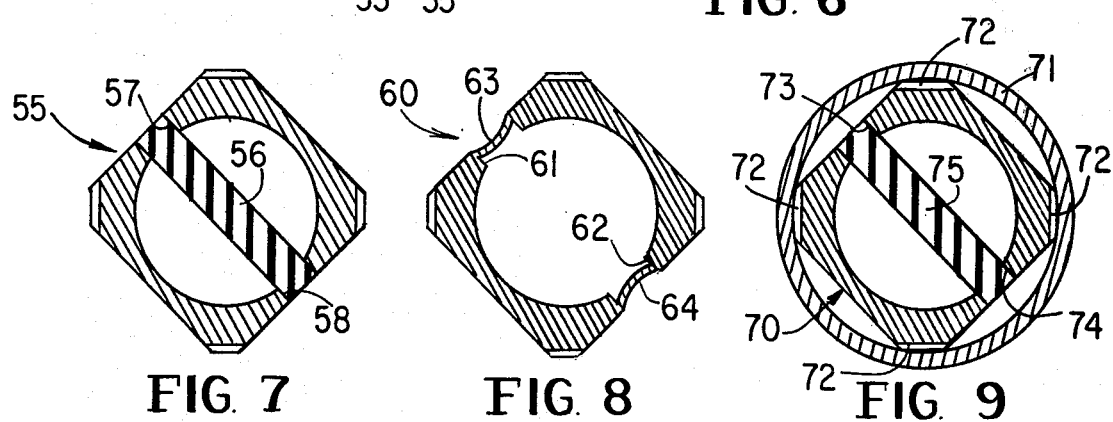

CONNECTOR FOR TUBES OF SQUARE CROSS-SECTION

BACKGROUND OF THE INVENTION

This invention relates to display racks, furniture and like structures formed with elongated tubes of square cross-section, and more particularly, to connectors for the ends of the square tubes used in such structures.

An object of the invention is to provide an effective connector for establishing a secure relationship with the end of a tube, or with the ends of two or more tubes.

Another object of the invention is to provide such a connector that can be manufactured at low cost.

Still another object is to provide a connector that is easy to install, and which avoids the use of screws, clips or friction fits which usually require pounding.

Yet another object is to provide a connector suitable for use with square cross-section tubes of either mill run (premium) grade or tubes of commercial (off the shelf) grade. The latter are available in smaller quantity and at lesser cost than the mill run grade.

Applicant believes he is familiar with commercially available connectors for tubes of square cross-section, and he represents that he never has encountered a connector constructed in accordance with this invention. Among the connectors on the market are those relying on a friction fit which must be forced (pounded) into an associated tube. Such connectors are subject to loosening under conditions of vibration, and are difficult to disassemble. Other prior connectors have a screw threaded in the connector which following assembly with a tube are backed into an accurately located opening in the tube. Other connectors use clips, separate wedge members and separate resilient members for establishing connections with associated tubes.

Prior art patents disclosing connector devices of the same general class as subject development are Italian Pat. No. 530,415 bearing dates of 1954, 1955 and 1957, and the following U.S. Pat. Nos.:
2,926,941
3,155,405
3,211,481
3,218,097
3,255,721
3,314,699

SUMMARY OF THE INVENTION

The connector of this invention may be a single connector member, one of two like members arranged colinearly to join two tubes in end to end manner, or may be one of a plurality of members forming part of a corner connector for ends of two, three, four, five or six tubes, all as well known in the art.

Applicant's connector and variants thereof have the same construction whether the member is used singly or as part of a colinear or corner connector having a plurality of connector members. For convenience, one connector member and variants will be described herein.

Mill run tubes of square cross-section, previously mentioned, have internal dimensions of closer tolerances, e.g., plus or minus 0.0004 inches, than tubes of commercial quality which have internal dimension tolerances of the order of plus or minus 0.010 inches. Subject connectors, as mentioned, are useable with tubes of both grades.

A connector embodying the invention comprises an elongated hollow metallic member of such size and shape in external cross-section as to be insertable within an end length of a square cross-section tube. The member has at least two longitudinal surfaces of minor width on opposite sides thereof. Spaced integral transverse teeth are provided on at least one of the longitudinal surfaces, the transverse distance between the exterior of the teeth and the opposite longitudinal surface being greater than an internal transverse dimension of a tube to be connected to the member. After the tube and connector preliminarily are assembled, relative rotation between the two in either direction through about $\frac{1}{8}$ of a turn causes the teeth to bite into an internal surface of the tube and thus establish secure connection.

The tube and connector are readily separated by relatively rotating the two in either direction through about $\frac{1}{8}$ of a turn, after which the two easily may be reassembled in subsequent use. The connector just described is suitable for use with tubes of mill run quality wherein tolerance in internal dimensions are low.

The connector is modified for use with tubes of commercial quality which have wider tolerances in internal dimensions. The elongated hollow metallic member of the connector is provided with a longitudinal slot extending from the connector end which is insertable within a tube. The slot is located in a wall of the member adjacent the toothed longitudinal surface of the member, the length of the slot being less than the length of the member insertable within the tube. Thus, the member flexes to a greater extent to accommodate wider tolerances in internal tube dimension.

A modified form of the slotted connector member contemplates the use of resilient material such as rubber, plastic and the like in the slot. The material serves to provide a greater range of resilience, more repeated uses and minimal breakage.

As an alternate to the resilient material, a thin integral wall overlying the exterior of the slot is provided, the wall preferably being arcuate in transverse cross-section. The connector member conveniently may be manufactured by the die casting method, and the dies simply are modified to provide the aforesaid thin integral wall.

Another form of connector, with or without a longitudinal slot, contemplates spaced integral transverse teeth on the longitudinal surface of minor width opposite the toothed surface described above. The teeth on the second surface also bite into an internal surface of the tube. In connectors of this form designed for use with tubes of commercial quality, two longitudinal slots desirably are provided, the two slots being oppositely disposed and of the same length as above described. Again, the slots may be filled with resilient material, or be provided with thin integral walls overlying the exteriors of the slots, the walls preferably being arcuate in transverse cross-section.

Another form of the invention contemplates a second pair of opposite longitudinal surfaces of minor width on the connector member, the second pair of surfaces being in quadrature relation with the first pair. Spaced integral transverse teeth are provided on each surface of the second pair of surfaces, the transverse distance between the exteriors of the teeth being greater than the internal transverse dimension of a tube to be connected to the member. Relative rotation between a tube and such a member inserted therein causes teeth on all surfaces to bite into internal surfaces of the tube and thus establish a connection of maximum security. This form also may have a pair of opposite longitudinal slots, and the slots may be provided with resilient material or overlying thin integral exterior walls.

BRIEF DESCRIPTION OF THE DRAWING

FIG. 1 is an exploded perspective view of a corner connector having three individual connectors embodying the invention, the connectors extending from a corner cube. The individual connectors, respectively, illustrate three embodiments of the invention.

FIG. 2 is an enlarged sectional view on line 2—2 of FIG. 1 at different angular orientation, the view also illustrating a tube in position for final assembly.

FIG. 3 is a sectional view like that of FIG. 2 except that the tube has been rotated to assembled position.

FIG. 4 is a sectional view on line 4—4 of FIG. 1 showing a preferred form of connector embodying the invention.

FIG. 5 is an elevational view of another modified form of connector embodying the invention.

FIG. 6 is a sectional view on line 6—6 of FIG. 5.

FIG. 7 is a sectional view comparable to FIG. 6 of another modified form.

FIG. 8 is a sectional view comparable to FIG. 6 showing still another modification.

FIG. 9 is a sectional view of the connector shown in FIG. 7, the view showing use of the connector with a tube of circular cross-section.

DESCRIPTION OF PREFERRED EMBODIMENTS

Referring to FIG. 1, the illustrated corner connector is generally designated 10. Corner connector 10 includes a conventional corner cube 11 having the same exterior cross-sectional dimensions as those of the tubes for which connector 10 is sized. Corner connector 10, as shown, has three connector members 12, 13 and 14. It is understood, of course, that a corner connector may have up to six individual connector members, and that the one illustrated is merely exemplary.

The various forms of connector members, such as members 12, 13, 14 and others that will be described later, have some structural features in common. These common features first will be described with reference to the connector member 12 in FIG. 1.

Connector member 12 is an elongated hollow metallic member of such size and shape in external cross-section as to be insertable within an end length of a tube of square cross-section. Such a tube, designated 15, is shown in spaced relation at the right in FIG. 1.

Elongated hollow metallic member 12 economically may be made by the die casting method. The same is true of the entire corner connector 10 shown in FIG. 1. As will be seen later, minor machining operations additionally are required with certain forms of the invention.

In all forms of the invention it is desirable to apply a finish to a corner cube 11, as well as to each connector member such as members 12, 13 and 14. Many tubes used in display racks, furniture, etc. are chrome plated, or otherwise finished to provide desired appearance. Since corner cube 11 ordinarily is exposed, it is finished to harmonize with associated tubes. Chrome plating applied to corner connector 10 not only provides desirable appearance, but it also imparts a desirable hardness quality to connector members 12, 13 and 15. Similarly, improved hardness can be achieved by anodizing in case aluminum is used for connector 10.

Still referring to FIG. 1, connector member 12 has at least two external longitudinal surfaces 20 and 21 (hidden) of minor width on opposite sides, the surfaces extending generally the length of member 12, as shown in the case of surface 20.

Member 12 also has spaced integral transverse teeth 22 on at least one of the longitudinal surfaces 20 and 21, teeth 22 being shown on surface 20 of member 12. The transverse distance between the exterior of teeth 22 on surface 20 and the opposite longitudinal surface 21 is slightly greater than an internal transverse dimension of a tube to be connected to member 12, for example, tube 15. An internal transverse dimension of tube 15 is designated d in FIG. 1.

A tube 15 is connected to connector member 12 as generally indicated in FIGS. 2 and 3. First, tube 15, properly oriented with respect to member 12 as shown in FIG. 2, is applied to the member. In the case of a corner connector 10, tube 15 will be brought into abutting relation with corner cube 11. Thereafter, tube 15 simply is rotated in either direction through about $\frac{1}{8}$ of a turn until teeth 22 on surface 20 and surface 21 are flush with internal surfaces 16 and 17, for example, of tube 15. Because of the difference in transverse distances mentioned above, teeth 22 bite into the tube surface with which they are engaged, and thereby establish secure connection between tube and connector. Disconnection occurs with equal ease by simply turning tube 15 through about $\frac{1}{8}$ of a turn in either direction. Generally speaking, connector member 12, as shown and above described, preferably is useable with a tube 15 of mill run quality having low dimensional variation.

In order to accommodate a tube 15 of commercial quality which has greater dimensional variation, it is preferred to employ the form of the invention embodied in connector member 13 at the right in FIG. 1. In this form, member 13 has two opposite longitudinal surfaces of minor width, surface 24 being the only one visible in FIG. 1. Spaced integral transverse teeth 25 are provided on surface 24. The feature of difference between member 13 and member 12 is that member 13 has a longitudinal slot 26 extending from the end of member 13 insertable within tube 15. Slot 26 is located in wall 27 of member 13 which is adjacent the wall containing surface 24 and teeth 25. The length of slot 26 is less than the length of member 13 insertable within tube 15. Reference is made to FIG. 5 for an exemplary showing of slot length in relation to the length of the member.

The transverse distance in member 30 between the exterior of teeth 25 and the opposite longitudinal surface is slightly greater than that used in member 12, slot 26 permitting the flexure necessary to accommodate tubes 15 of commercial quality. A tube 15 is connected with and disconnected from member 13 as previously described with respect to member 12.

Referring next to FIGS. 5 and 6, another modified form of the invention is shown. A connector member 30 is associated with a corner cube 31 shown in fragment. Member 30 has at least two external longitudinal surfaces 32 and 33 of minor width on opposite sides. Spaced integral transverse teeth 35 are provided on surface 33. The transverse distance between the exteriors of teeth 34 and teeth 35 is greater than the internal transverse dimension of a tube 15 to be connected to the member.

If a tube 15 is of commercial quality, a slot 36, similar to the previously described slot 26, is provided in a wall 37 of member 30 adjacent the wall containing surface 33 and teeth 35. Similarly, a slot 38 (FIG. 6) is provided in wall 39 adjacent the wall having surface 32 and teeth 34. The two slots 36 and 38, of course, afford greater flexibility for accommodation of tubes 15 of greater dimensional variation.

Referring again to FIG. 1, a preferred form of the invention is embodied in connector member 14. In this form, member 14 has two pair of opposing longitudinal surfaces of minor width, namely, surfaces 40, 41, 42 and 43. These surfaces are in quadrature relation as best shown in FIG. 4. Spaced integral transverse teeth are provided on each of these longitudinal surfaces. Thus, surface 40 has teeth 44, surface 41 has teeth 45, surface 42 has teeth 46 and surface 43 has teeth 47. If die casting is used, one pair of teeth would be formed by subsequent machining operations. The illustrated member 14 is designed for commercial quality tubes, and accordingly is provided with an opposing pair of longitudinal slots 50 and 51. A tube 15 is connected to member 14 as previously described, and in this instance, teeth in all four rows bite into internal surfaces of the tube and thus establish a connection of maximum strength.

While slots may not be necessary in connector members used with tubes of mill run quality, as a practical matter slots likely will be used in all connector members because such members thereby are useable with tubes of both mill run and commercial quality. Further, slotted members have desirable flexibility which avoids the possibility that the relative dimensions of a connector member and tube are such as to prevent connection.

FIGS. 7 and 8 illustrate further refinements of the invention. In FIG. 7, a connector member 55, such as previously described member 14 with four rows of teeth and two slots, is provided with resilient material 56, such as rubber, plastic and the like, inserted in the slots 57 and 58. Resilient material 56 enhances the resilient characteristic of member 55 and desirably is used for products that will be assembled and disassembled frequently. Absent such resilient material, there may be a tendency for the metal in connector 55 to experience fatigue or take a set that in time might lead to faulty connection or breakage.

FIG. 8 shows a connector member 60, again generally like member 14 with four rows of teeth and two slots, but embodying an alternative arrangement for providing additional resilience at slots 61 and 62. This arrangement is particularly suitable in connector members formed by the die casting process. The dies are modified to provide thin integral walls 63 and 64 extending across the exterior of slots 61 and 62. The walls 63 and 64 desirably are arcuate in transverse cross-section for better flexing action.

FIG. 9 illustrates the use of a connector 70 embodying the invention with a tube 71 of circular cross-section. While subject connector was not designed primarily for circular tubes, the forms of the invention embodying slots have been found to work well with circular tubes, notwithstanding that the biting action of the teeth into the tube interior does not occur in the same manner or to the same extent as with tubes of square cross-section.

Thus, member 70, as shown has four rows of transverse teeth 72 in quadrature relation and a pair of opposite slots 73 and 74. Resilient material 75 desirably is used in the two slots. Pounding action generally is necessary to establish connection between member 70 and circular tube 71, but member 70 flexes sufficiently so that teeth 72 make firm engagement with the interior of tube 71. If sufficient resilience is present, relative rotation between member 70 and tube 71 will produce teeth biting action to a degree and enhance the firmness of the connection. Disassembly is produced by pulling action, and facilitated by rotational movement.

Alternatively, member 60 shown in FIG. 8 likewise may be used with a circular tube, as well as any of the other connectors described herein, particularly those with slots. In all cases, however, the transverse distance between the exterior of a row of teeth and the opposite longitudinal surface or teeth exterior is slightly greater than the diameter of the circular tube.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A connector for tubes of square cross-section comprising:
   an elongated hollow metallic member of such size and shape in external cross-section as to be insertable within an end length of a tube for connection therewith, said member having at least two external longitudinal surfaces of minor width on opposite sides thereof;
   spaced integral transverse teeth on at least one of said longitudinal surfaces;
   the transverse distance between the exterior of said teeth and said opposite longitudinal surface being greater than an internal transverse dimension of a tube to be connected to said member,
   whereby relative rotation between a tube and said member inserted therein causes said teeth to bite into an internal surface of the tube and thus establish secure connection.

2. The connector of claim 1 wherein said elongated hollow metallic member has a longitudinal slot extending from the end thereof insertable within a tube, said slot located in a wall of said member adjacent said longitudinal surface having teeth, the length of said slot being less than the length of said member insertable within the tube, whereby said member accommodates tolerances in internal tube dimension.

3. The connector of claim 2 with the addition of resilient material such as rubber, plastic and the like in said slot.

4. The connector of claim 2 with the addition of a thin intregal wall overlying the exterior of said slot.

5. The connector of claim 4 wherein said thin integral wall is arcuate in transverse cross-section.

6. The connector of claim 1 with the addition of spaced integral transverse teeth on said opposite longitudinal surface of minor width whereby said added teeth also bite into an internal surface of the tube.

7. The connector of claim 6 wherein said elongated hollow metallic member has a pair of longitudinal slots extending from the end thereof insertable within a tube, one of said slots located in a first wall of said member adjacent one of said longitudinal surfaces having teeth, and the other of said slots located in a second wall of said member adjacent said opposite longitudinal surface having teeth, the length of said slots being slightly less than the length of said member insertable within the tube, whereby said member accommodates tolerances in internal tube dimension.

8. The connector of claim 7 with the addition of resilient material such as rubber, plastic and the like in said slots.

9. The connector of claim 7 with the addition of thin integral walls overlying the exteriors of said slots.

10. The connector of claim 9 wherein said thin integral walls are arcuate in transverse cross-section.

11. The connector of claim 6 with the addition of a second pair of opposite longitudinal surfaces of minor width on said member, said second pair of surfaces being in quadrature relation with said first pair, spaced integral transverse teeth on each surface of said second pair of surfaces, the transverse distance between the exteriors of said teeth on said second pair of surfaces being greater than an internal transverse dimension of a tube to be connected to said member, whereby relative rotation between a tube and said member inserted therein causes said teeth to bite into internal surfaces of the tube and thus establish secure connection.

12. The connector of claim 7 with the additions of claim 11.

13. The connector of claim 12 with the addition of resilient material such as rubber, plastic and the like in said slots.

14. The connector of claim 12 with the addition of thin integral walls overlying the exteriors of said slots.

15. The connector of claim 14 wherein said thin integral walls are arcuate in transverse cross-section.

16. A connector for tubes of circular cross-section comprising:
an elongated hollow metallic member having at least two external longitudinal surfaces of minor width on opposite sides thereof;
spaced integral transverse teeth on at least one of said longitudinal surfaces;
the transverse distance between the exterior of said teeth and said opposite longitudinal surface being greater than any other transverse dimension of said member and greater than the internal diameter of a tube to be connected to said member,
whereby secure connection between said member and a tube is achieved by forcing the tube on said member.

* * * * *